May 17, 1927.
V. C. DE YBARRONDO
1,629,097
APPARATUS FOR HANDLING MOTION PICTURE FILMS
Filed May 16, 1923
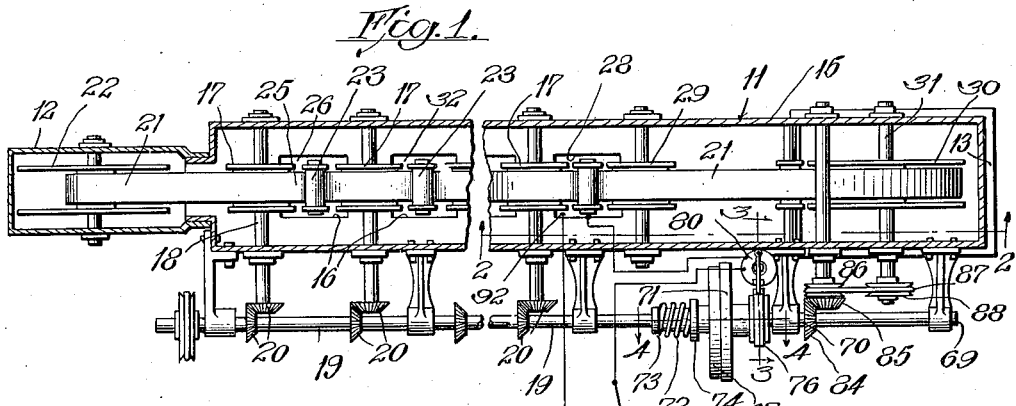
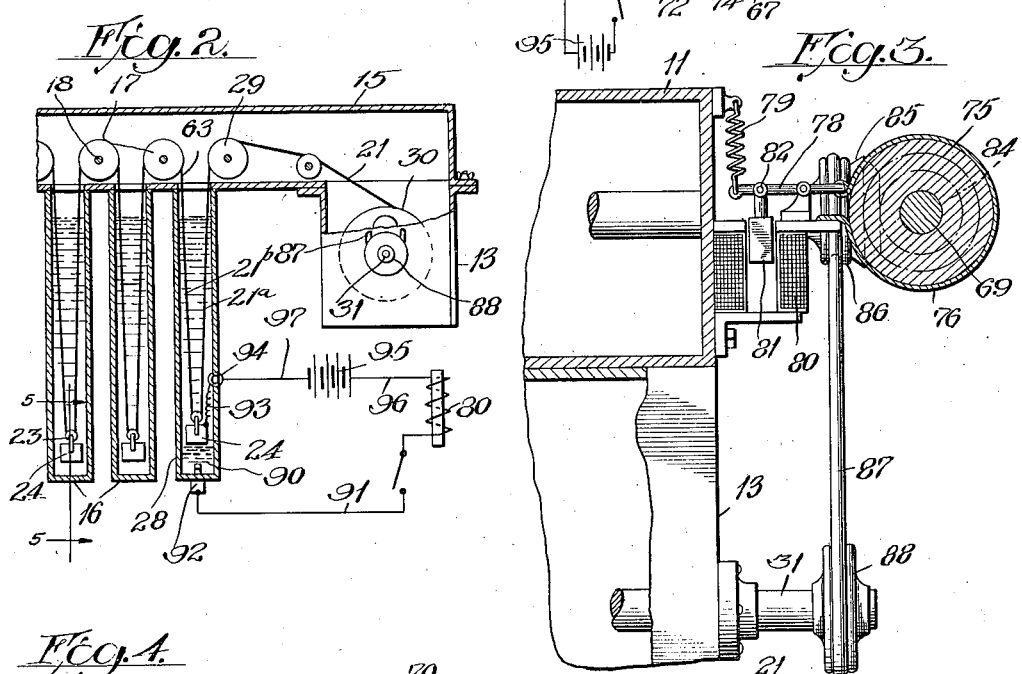
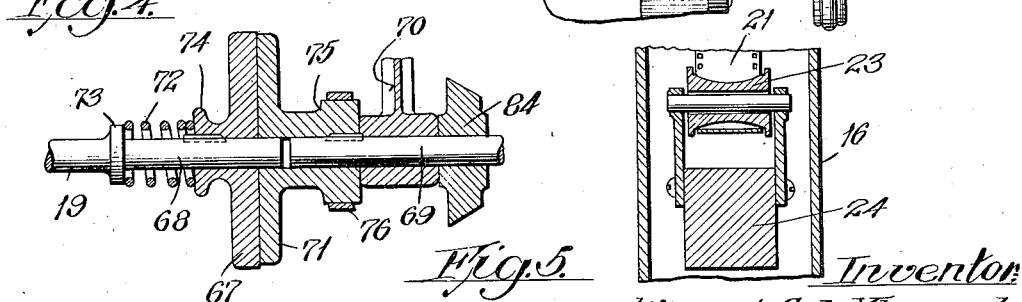
Inventor
Vincent C. de Ybarrondo,
By
Attorney.

Patented May 17, 1927.

1,629,097

UNITED STATES PATENT OFFICE.

VINCENT C. DE YBARRONDO, OF LOS ANGELES, CALIFORNIA.

APPARATUS FOR HANDLING MOTION-PICTURE FILMS.

Application filed May 16, 1923. Serial No. 639,344.

In the production of motion picture films, it is often necessary to film scenes upon locations very remote from the film laboratories in which the films are developed, printed and otherwise prepared for commercial usage.

The invention contemplates means which make possible the development of films on location so that they may be inspected in order to determine whether they will be suitable for ultimate use, thus making it possible to find errors before the location is left, so that such scenes as are improperly filmed, may be taken over again before leaving the location, thus eliminating the great expense entailed in sending a company back on location to retake certain portions of a production.

It is an object of the invention to provide an improved apparatus whereby a negative film may be developed and inspected and thereafter preserved until shipped to the film laboratory for completion of the necessary operations thereupon entering into the production of the finished product.

It is a further object of the invention to provide a film winding mechanism, which will prevent strains being placed upon the film which would cause the stretching thereof with the result of bringing the film out of register.

The especial advantages of the invention and further objects thereof will be made evident hereinafter.

Referring to the drawing which is for illustrative purposes:

Fig. 1 is a fragmentary plan view partially in section showing the apparatus of my invention provided with an improved form of film winding control, the electric circuit therefor being shown diagrammatically.

Fig. 2 is a fragmentary view to reduced scale taken on the line 2—2 of Fig. 1 and diagrammatically illustrating the electrical circuit of the winding reel retarding control means.

Fig. 3 is a sectional view taken on the line 3—3 of Fig. 1.

Fig. 4 is a sectional view taken on the line 4—4 of Fig. 1.

Fig. 5 is a sectional view taken on the line 5—5 of Fig. 2.

In Fig. 1 of the drawing, 11 represents a portable developing machine to which a film magazine or other film container 12 may be attached at the forward end thereof and to which a film container 13 for receiving the developed film may be attached, as indicated in Fig. 2. The developing machine 11 includes a longitudinally extending shell 15, from which there downwardly extends a plurality of tubes 16. Spaced intermediately between the upper ends of the tubes 16 are film pulleys 17 which are mounted upon shafts 18, driven from a line shaft 19 by means of gears 20. A negative film 21 from a reel 22 situated within the magazine 12 is carried over the first pulley 17 whereupon it is inserted under the spool 23 of a weight member 24, whereupon the spool is allowed to recede into the first tube 16 in the form of a loop 25, this loop extending into a body of developing solution 26. The film is then passed over the consecutive pulleys and formed into loops extending downwardly into the succeeding tubes 16. Weight members 24 of the type previously mentioned and shown in further detail in Fig. 5 may be used to hold the loops in their respective tubes 16. After passing out of the final tube 16, specifically designated by the numeral 28, the film is carried over an idler pulley 29 and is wound upon a reel 30 or other suitable member supported upon a shaft 31 situated within the container 13. The respective tubes 16 are filled with developing solutions, fixing solutions and water in respective order; the first one of the tubes at the left hand side of the developing machine containing developing solutions, the next succeeding tube indicated as 32 containing a fixative for hardening the gelatin coating and the following tubes between the tube 32 and tube 28 being filled with water for washing the film as it passes therethrough.

A motion picture film when in wet condition may be readily stretched and distorted. My invention provides a means for controlling the rotation of the reel upon which the film is wound in such a manner that excessive pulling strains are not placed upon the film.

In the form of driving device, shown in the drawings, the final roller 29 is mounted upon a freely rotatable shaft, so that the film 21 may be drawn freely thereover when the reel 30, situated in the container 13 is rotated. The loop 63 of film extending between the roller 29 and the adjacent driven roller 17, is weighted by a member 24 in the customary manner. It will be recognized that if the film 21 were drawn over the roller 29 at a higher rate of speed than it were fed into the loop 63 by the pulley 65, the take-up run 21ª of the film loop would have a faster lineal travel than would the feed run 21ᵇ of said loop and a shortening of the loop would result which would cause a raising of the member 24. The invention employs this raising of the member 24 to actuate the driving mechanism associated with the reel 30 in such a manner that the reel will be intermittently rotated. The mechanism as shown in Figs. 1, 2 and 3 and 4 may conveniently consist of a friction plate 67 splined upon the rearward end 68 of the drive shaft 19 which is employed for driving the pulleys 17. Upon a stub shaft 69 held in a bearing bracket 70 is a cooperating friction plate 71 adapted to be frictionally rotated by the plate 67 which is held in resilient contact by means of a spring 72 placed between a collar 73, formed upon the shaft 19, and the hub 74 of the plate 67. The hub 75 of the friction plate 71 is somewhat enlarged and has a brake band 76 disposed therearound as shown in Fig. 3. The hub 75 is ordinarily gripped and held stationary by the brake band 76 due to the constricting action of a lever 78 which is pulled upwardly by a spring 79. A solenoid 80 is disposed in a position to pull a core member 81 downwardly. This core member is attached at 82 to the lever 78 and is drawn downwardly by the solenoid 80 with sufficient strength to overcome the spring 79, with the result that whenever the solenoid 80 is energized the brake band 76 is released and the plate 71 permitted to rotate freely due to the frictional engagement therewith of the plate 67 which rotates with the drive shaft 19, the shaft 69 being rotated by the plates 71 which rotates a bevel gear 84 which in turn drives a bevel gear 85, mounted in such a manner as to be turnable with a sheave 86 over which a belt 87 extends to a sheave 88 mounted upon the shaft 31, which supports the reel 30 in the container 13.

From the foregoing, it will be recognized that whenever the solenoid 80 is energized, the reel 30 will be rotated. The energization of the solenoid is accomplished by the use of the equipment diagrammatically shown in Fig. 2. This equipment consists of a body of mercury 90 placed in the lower end of the tube 28; a conductor 91 extending from the solenoid 80 to an electrode 92 which extends through the bottom of the tube 28 and makes contact with the body of mercury 90; a flexible conductor 93 extending from the member 24 to the stationary conductive member 94, insulated in the wall of the tube 28; and a battery or other electrical source 95, which is connected to the solenoid 80 and the member 94 through conductors 96 and 97; thus forming a control circuit which is closed when the member 24 is in contact with the body of mercury 90, and permitting the rotation of the reel 30, and which circuit is interrupted when the member 24 is raised from contact with the body of mercury 90 due to the shortening of the loop 63. This control for film winding device is suitable for use in various equipment wherein film is carried between sprockets or is wound from sprockets.

It will thus be seen that the tension placed upon the film, while it is being drawn through my field developing machine, may be controlled within very close limits. This is an especially desirable feature of my machine inasmuch as the photographic film, it is designed to develop, is very inelastic and if stretched but very slightly will become distorted and ruined for its intended use. This very close control of the tension placed upon the film 21 is made possible by the exceedingly slight additional tension necessary to be placed upon the film 21 between the right hand pulley 17 and the winding reel 30 in order to raise the weight 24 in the tube 28 from bare contact with the mercury 90 out of contact therewith. This control of the film tension will permit the operator to start a reel of film developing and pay no more attention to it until the developing of the reel is completed. Thus the camera man or his assistant may develop all his films in the field without an excessive amount of his attention being taken from his photographing work.

I claim as my invention:

1. In a film handling apparatus, the combination of: a film feeding mechanism; a film take-up mechanism; a film operatively associated with said mechanisms and arranged to form an intermediate depending loop; friction means for applying power to said take-up mechanism; gravity means hanging in said loop and adapted to be elevated when the loop is shortened by a speed increase of lineal travel of its take-up run; and means controlled by said gravity means for causing slippage of said friction means by frictionally retarding the rotation of said take-up mechanism when said gravity means reaches a predetermined elevation.

2. In a film handling apparatus, the combination of: a film feeding mechanism; a film take-up mechanism; a film operatively associated with said mechanisms and arranged to form an intermediate depending loop; clutch means for applying power to said take-up mechanism; gravity means hanging in said loop and adapted to be elevated when the loop is shortened by a speed increase of the lineal travel of its take-up run; and means controlled by said gravity means for slipping said clutch means by frictionally retarding the rotation of said take-up mechanism when said gravity means reaches a predetermined elevation.

3. In a film treating apparatus, the combination of: a film feeding mechanism; a film operatively associated with said mechanism and arranged to form an intermediate depending loop; a take-up mechanism for taking up the film from the film loop; a gravity spool hanging in said film loop and adapted to be elevated when said loop is shortened by an increase in the take-up of the film relatively to its rate of feed; a primary friction member driven by said primary spool driving mechanism; a secondary friction member through which the take-up mechanism is driven from said primary friction member; and means controlled by the gravity spool hanging in said film loop and arranged to grip said secondary friction member against rotation when said gravity spool is elevated to a predetermined point by a shortening of said film loop.

In testimony whereof, I have hereunto set my hand at Los Angeles, California, this 10th day of May 1923.

VINCENT C. de YBARRONDO.